Aug. 12, 1958  T. C. STRINGFELLOW  2,847,137
DETACHABLE-BODY CARGO CARRIER
Filed Feb. 23, 1955  3 Sheets-Sheet 1
Fig. 1
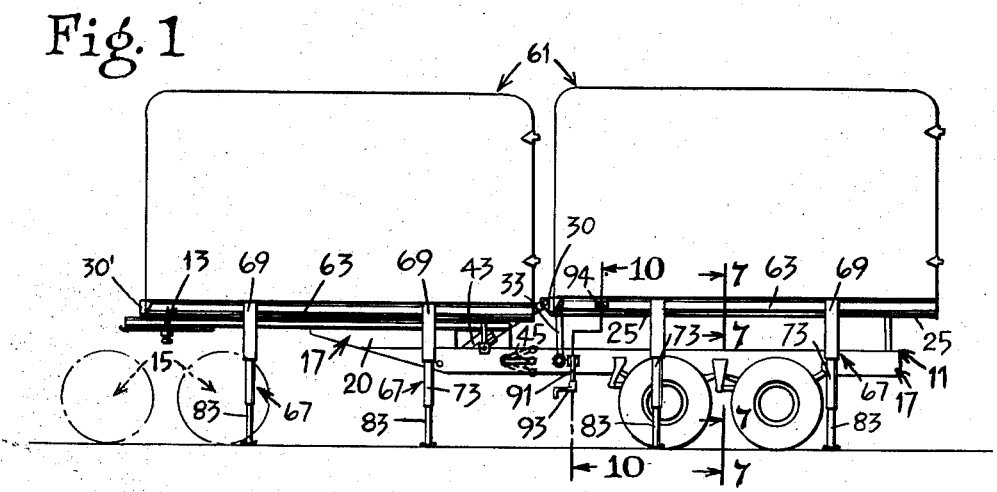
Fig. 2
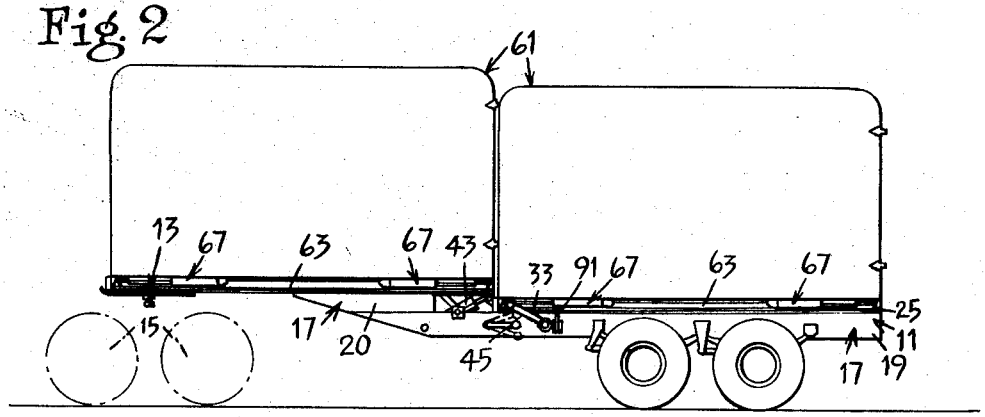
Fig. 7
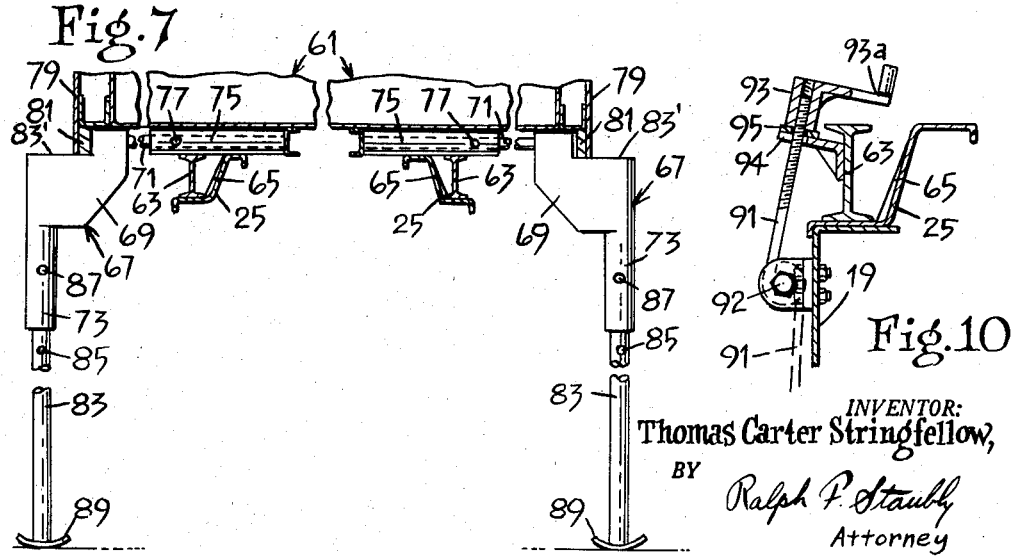
Fig. 10
INVENTOR:
Thomas Carter Stringfellow,
BY
Ralph F. Staubly
Attorney

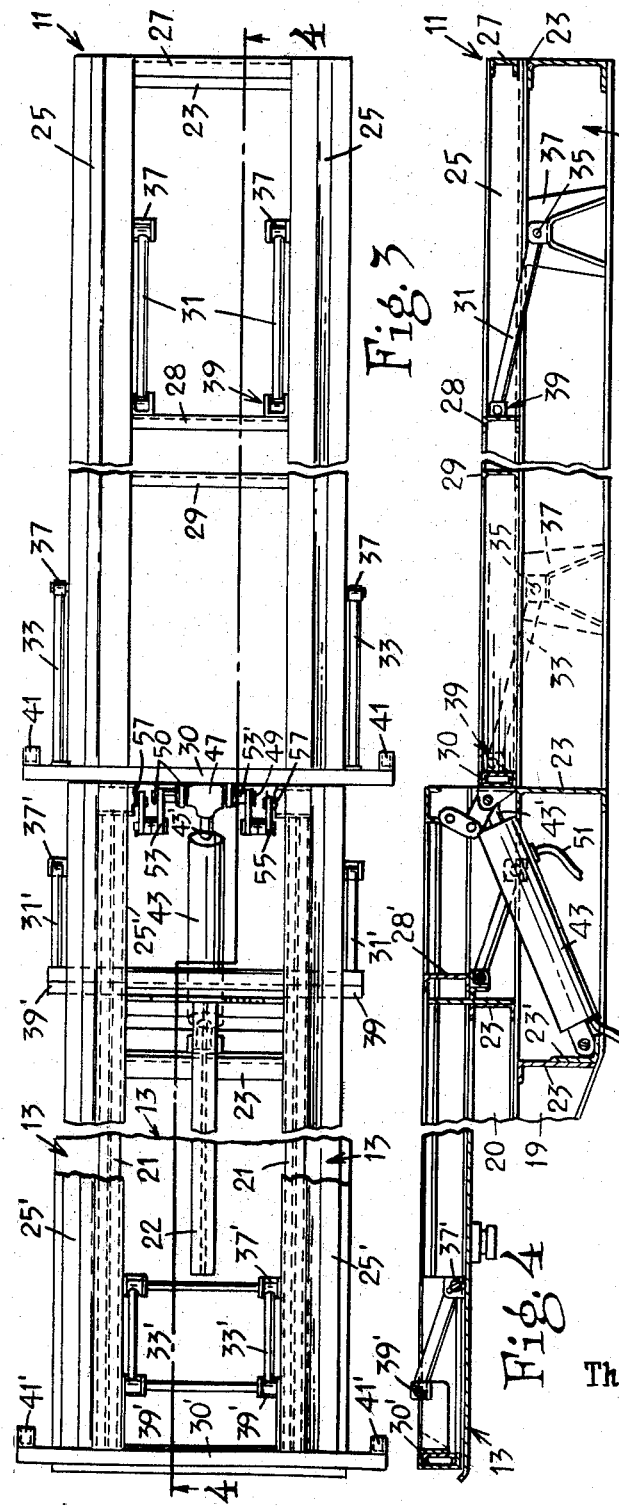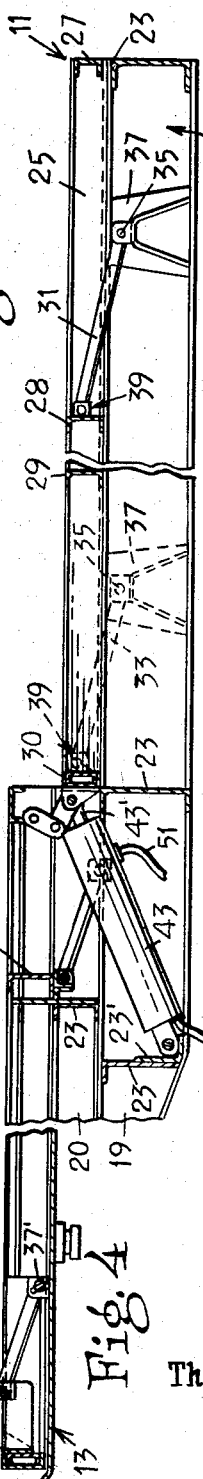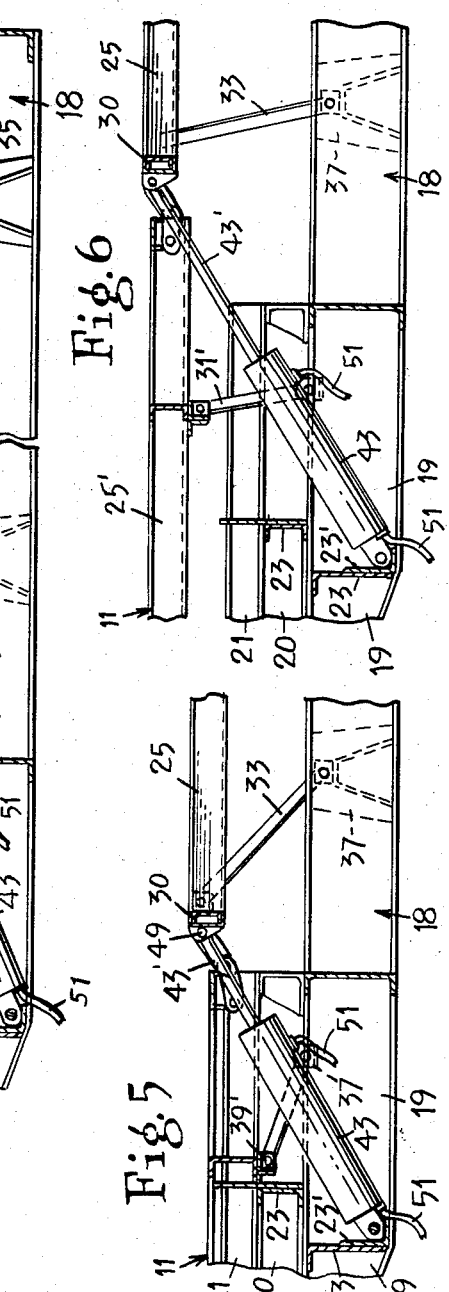

Aug. 12, 1958 T. C. STRINGFELLOW 2,847,137
DETACHABLE-BODY CARGO CARRIER
Filed Feb. 23, 1955 3 Sheets-Sheet 3
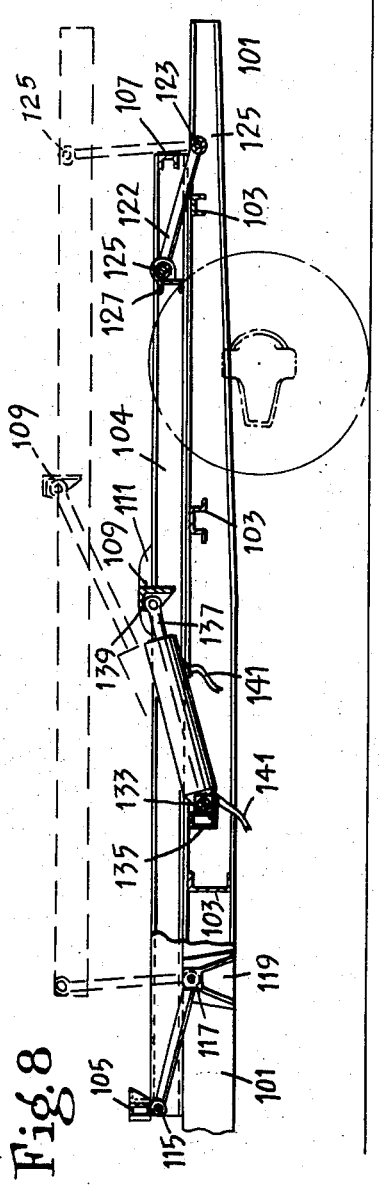
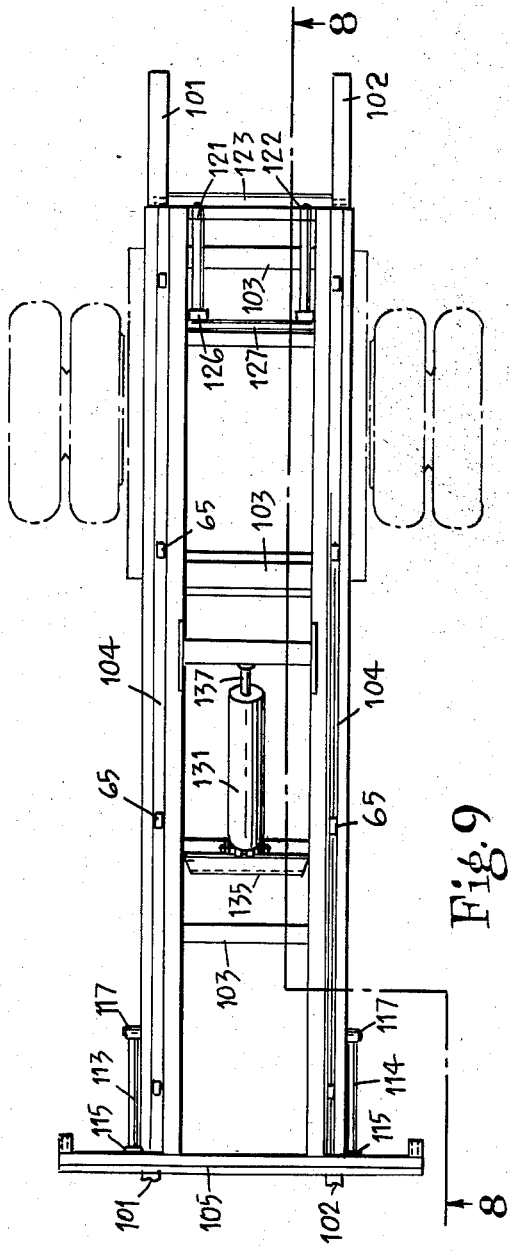
INVENTOR:
Thomas Carter Stringfellow,
BY Ralph P. Staubly
Attorney

2,847,137
DETACHABLE-BODY CARGO CARRIER

Thomas Carter Stringfellow, Nashville, Tenn.

Application February 23, 1955, Serial No. 490,053

11 Claims. (Cl. 214—515)

This invention relates to a detachable-body cargo carrier.

More particularly the invention pertains to a truck or trailer having one or a plurality of tandem-mounted bodies removably carried thereon so that a truck (or trailer) and driver need not be idled while the cargo is being loaded, unloaded or stored, said truck or trailer being provided with built-in power-operated lifting apparatus and said bodies being provided with retractable height-adjustable laterally positionable supports, whereby said bodies may be quickly, easily, safely and interchangeably picked up or set down by said trucks when and as desired.

Present-day trucks and trailers are very wasteful in not fully utilizing the time of truck drivers and in being idle for long periods of time during loading and unloading of cargos from their attached bodies. Large trailers also lose much of their economic value when their loads have more than a single destination. The present invention overcomes these disadvantages by providing truck or trailer having an economically constructed built-in lifting apparatus, and easily, quickly and safely attachable supports that permit the truck or trailer to be driven under or out from under the elevated bodies. With this invention separate bodies can be carried in tandem-fashion on a large truck or trailer for separate delivery. It also makes economical the use of detachable van-type bodies as portable stock-rooms, stores, etc.

It is accordingly a principal object of this invention to provide cargo carriers having easily, quickly and safely detachable interchangeable bodies, whereby trucks (or trailers) and their drivers will not be idled during loading or unloading of the cargos of the bodies, and whereby many bodies can be handled by a single driver and his vehicle.

It is another object to provide a detachable-body cargo carrier having one or more bodies supported by retractable supports when detached from their carrier.

It is a further object to provide a truck or trailer having built-in lifting means for raising or lowering a detachable body having retractable supports, so that said body may be quickly and easily picked up or set down where and as desired.

These and other objects and advantages of the invention will become apparent as the following detailed description proceeds.

In the drawings forming a part of this specification and in which like reference characters refer to the same parts throughout the several views:

Fig. 1 is a side elevational view of a tandem-body trailer embodying the invention, showing the bodies in elevated positions.

Fig. 2 is a view similar to Fig. 1, but showing the bodies in transporting positions on the trailer.

Fig. 3 is an enlarged foreshortened plan view of the basic trailer structure of Figs. 1 and 2, with the bodies removed.

Fig. 4 is a side elevational view of the showing of Fig. 3 taken in section on the line 4—4 of Fig. 3.

Fig. 5 is a fragmentary side elevational view of the left central portion of Fig. 4, showing the rear lifting means in partly elevated position.

Fig. 6 is a view similar to Fig. 5 but showing both the rear and front lifting means in their substantially fully elevated positions.

Fig. 7 is an enlarged end elevational view of the body-supporting structure of Fig. 1, in section taken on the line 7—7 of Fig. 1.

Fig. 8 is a fragmentary side elevational view, partly broken away and partly in longitudinal medial section, showing the invention embodied in a conventional two-axle truck.

Fig. 9 is a plan view of the showing of Fig. 8.

Fig. 10 is an enlarged elevational view of the hold-down mechanism, in section taken on the line 10—10 of Fig. 1.

With reference now to the drawings, and first to the species of Figs. 1–7, and 10, the numeral 11 generally designates a semi-trailer, which is herein disclosed as being of the tandem-axle type. Trailer 11 is adapted, by the fifth-wheel plate 13 and pin 13' generally designated 13, to be supported at its front end and to be pulled by a powered vehicle, schematically represented by the wheels 15. The chassis of the trailer 11 is formed of a pair of said beams 17 and 18. Each of the beams 17 and 18 consists of a rear pressed-steel, channel-bar 19, an intermediate member 20 formed of pressed channel-bars, and an I-beam 21. The relatively short I-beam 22 is disposed between the I-beams 21, as shown in Fig. 3. The beams 17, 18 and 22 are rigidly joined into a unitary frame by any desired number of transverse cross members 23.

The lift mechanism for the rear truck bodies will next be described. Said lift mechanism comprises a pair of bars 25 of Z-shape in cross-section (as best seen in Fig. 7). The Z-bars 25 are connected by a plurality of transverse members 27, 28, 29 and 30. The rigid rectangular frame formed by the Z-bars 25 and the transverse members 27—30, are connected to the trailer chassis members 19 by a pair of internally located links 31 and a pair of externally located links 33, which links movably connect the lift frame to the chassis members 19 for parallelogram-type upward and rearward swinging. The relatively stationary ends of the links 31 and 33 are pivotally connected at 35 to the bearing-carrying brackets 37, which are welded or otherwise connected to the inner or outer faces of the members 19. The swinging ends of the links 31 and 33 are connected to the transverse members 28 and 30 by the bearing devices generally designated 39. It should here be noted that the transverse member 30 is purposely extended laterally beyond the outer edges of the Z-bars 25, and are provided with the rearwardly extending rest brackets 41 which underly the removable cargo-carrying bodies to provide a more stable support therefor.

The lifting frame basically formed by the Z-bars 25 and the cross members 27—30 is power-driven upwardly and rearwardly by a hydraulic or pneumatic double-acting ram cylinder 43, which is swivelly and rigidly connected to the transverse member 23', as shown in Figs. 4–6. The double-acting piston (not shown) of the cylinder 43 is power-driven in both directions under the control of a diverting valve (not shown) in known manner and controlled by a readily accessible lever 45 (Fig. 2). Lever 45 is preferably spring-loaded to neutral position (which herein is indicated by the full-line position of Fig. 2) to provide a "dead-man" control. The piston-rod 43' carries at its outer end a clevis 47. Clevis 47 embraces a shaft 49, which is rigidly attached to the cross-member 30 of the lift frame. The up and down movements of said lift frame is effected by flow of fluid into cylinder 43 above or below the piston thereof through the pressure-lines 51, in known manner.

The forwardly located lift frame is basically identical with the rearwardly disposed lift frame previously described. Said forward frame comprises a spaced pair of parallel Z-bars 25' rigidly connected by the cross members 28' and 30'. Z-bars 25' are connected to the underlying chassis structure by the swinging links 31' and 33' similar to their counterparts on the rear lift frame, reversed as to inner and outer location. The links 31' and 33' are similarly connected to the chassis structure and to the lift frame by the bearing devices 37' and 39'. The elongated transverse member 30' also carries on its outer ends a pair of body-supporting and stabilizing brackets 41'. The forward lift frame is powered by the same pressurized-fluid cylinder 43 that operates the first-described lift frame. This is effected preferably by means of a free-play or delayed-action linkage, next to be described.

The delayed-action linkage comprises the links 53 carried by bearing sleeves 53' which embrace the shaft 49, and the links 55 pivotally connected to the Z-bars 25' by the posts 57. The other ends of the links 53 and 55 are pivotally connected by the shaft 59, to thus form a flexible delayed-action connection between the two lift frames, whereby the forward frame does not begin to move until the rear lift frame reaches an intermediate point in its normal travel. It is desired that both frames shall reach maximum elevation at about the same time. This mode of operation is made possible by providing longer parallelogram links for the rear lift frame than for the front lift frame. It should here be noted that the shaft 49 is fixed to the cross member 30 by lug plates 50.

The numeral 61 generally designates each of the interchangeable removable bodies, which are herein illustrated as being of the van-type. The understructure of each of the bodies 61, preferably comprises a pair of longitudinally extending beams 63 supportedly underlying and interconnected by any desired number of transverse members (not shown), in known manner. The bottom webs of beams 63 rest upon the horizontally disposed webs of the Z-bars 25 (best shown in Fig. 7). It should here be noted that the Z-bars 25 are desirably provided with friction-reducing metallic pads or plates 65 suitably spaced along the upright webs of the Z-bars 25 (Figs. 7 and 9).

The bodies 61 are provided with retractable adjustable leg-jacks or supports generally designated 67. Supports 67 comprise head portions 69 to which are rigidly fixed the horizontally and vertically extending tubular elements 71 and 73. Tube 71 serves as a shaft and is rotatably received in a tubular socket 75. A pin 77, engageable in spaced holes (not shown) in the shaft 71, holds the shaft 71 and thereby the support 67 at the desired lateral adjustment. Pin 77 also tends to prevent rotation of the shaft 71 in the socket 75 to thus hold the support 67 in desired vertical orientation, being assisted in this function by engagement between the rib rail 79 (with or without the added backing member 81) and the seat 83' formed on the support head 69.

When the supports 67 are moved to their inner or storage positions, seats 83' clear the elements 79 and 81, thus permitting the supports 67 to be swung upwardly into storage positions shown in Fig. 2, in which positions they are held by any suitable anchoring means (not shown). The tubular sockets 73 of the supports 67 telescopically receive the legs or shafts 83. Legs 83 are provided with spaced transverse bores 85 for selectively receiving the anchoring pins 87 in transverse bores in the tubular members 73. Legs 83 may be provided with feet 89 of any desired construction.

Fig. 10 discloses in detail the hold-down device disclosed in Figs. 1 and 2. Said device comprises an eye-bolt 91 vertically attached to the beam member 19 by a U-bracket-mounted pin 92. The free ends of the eye-bolt 91 are threaded as shown to receive the internally threaded sleeve 93. Sleeve 93 has firmly fixed and laterally extending therefrom a crank arm 93–A. The free end of the eye-bolt 91 is adapted to be received within the slot of a bracket 94 the base of which bracket is welded to the body-supporting I-beam 63. A washer 95 is interposed between the sleeve 93 and the bracket 94 the base of which bracket is welded to the body-supporting I-beam 63. A washer 95 is interposed between the sleeve 93 and the bracket 94 to reduce wear and friction. By this mechanism the removable bodies 61 may be quickly and easily and safely firmly connected to the chassis of the vehicle.

Figs. 8 and 9 disclose a second species of the invention as applied to a conventional two-axle vehicle, of the straight-chassis type, as opposed to trailer construction. In this modification of the invention the chassis of the vehicle comprises a pair of longitudinally extending, laterally located beams 101 and 102, cross-braced by the transverse members 103.

The lift frame in this species of the invention comprises a pair of substantially parallel Z-bars 104 rigidly interconnected by the transverse box-beam 105, rear channel-bar 107, and intermediate angle-bar 109, welded to the Z-bars 104, with their junctions being re-inforced by the plates 111. The frame formed by members 104—111 is movably connected to the chassis members 101 and 102 by a linkage system next to be described.

The linkage mechanism comprises a forward pair of links 113 and 114, pivotally connected to the transverse member 105 at 115, and pivotally connected to the chassis members 101 and 102 by bearings 117 formed in or carried by the bearing brackets 119. The linkage system further comprises a pair of rear links 121 and 122, welded at their rear ends to the transverse shaft 123. Shaft 123 is journaled at its ends in bearings formed in or carried by the plates 125. The forward ends of links 121 and 122 are journaled at 125 in a bearing 126 mounted on the transverse member 127.

The rectangular lift-frame formed by the elements 104—111, is power-driven by a pressurized fluid-operated cylinder 131. Cylinder 131 is pivotally attached at 133 to the base member 135 bridging and firmly anchored to the chassis members 101 and 102. The piston rod 137 is pivotally connected at 139 to the transverse lift-frame member 109, as shown in Fig. 8. Cylinder 131 is of the double-acting type and is energized by pressurized fluid supplied to both sides of the piston (not shown) through the pressure lines 141, in known manner.

It is also desirable to control the raising and lowering of the lift-frame by control devices similar to that generally designated in the first-described species.

While I have disclosed certain preferred embodiments of my invention, it is to be understood that many changes can be made in the size, shape, composition and arrangement of the parts without departing from the spirit of the invention as defined in the subjoined claims.

Having thus described my invention, I claim:

1. A detachable-body cargo carrier, comprising: longitudinally extending chassis members, at least one van-type cargo-carrier body adapted to be supported above said chassis members for transportation thereby, lifting means connected to said chassis members and engageable with said body to lift or lower the same away from or toward said chassis members, power-applying means for raising or lowering said lifting means, means for co-ordinating the lifting action of said lifting means and power-applying means to provide desired lifting and lowering of said body, said body having longitudinally extending support- and frame-forming beams thereunder, said lifting means including longitudinally extending elements supportingly engaging said beams to liftingly support said body on the chassis of said apparatus, said lifting means comprising at least one rectangular frame, and link means connecting said frame to said chassis members for holding said frame and members substantially parallel during their relative lifting or lowering movements.

2. Apparatus according to claim 1, said elements being Z-bars having their upright webs oppositely angled relative to the vertical whereby the said webs will guide said lifting means into nesting engagement with said beams for seating of the latter on the bottom webs of said bars.

3. Apparatus according to claim 1, said lifting means including at least one pressurized-fluid force-applying device for effecting and controlling the lifting action of said lifting means.

4. Apparatus according to claim 1, said lifting means comprising at least two longitudinally spaced frames for supporting individual cargo-carrier bodies and means for co-ordinating the lifting action of said frames so that one of the supported bodies can be lifted at a time, whereby an economy in design and use of said lifting means is effected, said co-ordinating means comprising free-play delayed-action pull-means whereby a first-operated frame will exert a pull upon a subsequently-operated frame, said frames being supported by parallelogram-type links of different lengths as between frame members.

5. Apparatus according to claim 1, said lifting means comprising at least one rigid frame, and said power-applying means being adapted to securely hold down said lifting means in the transportation positions of said frame and body.

6. Apparatus according to claim 5, and additionally including locking means for firmly securing said body to the chassis formed in part by said chassis members.

7. Apparatus according to claim 1 and additionally comprising locking means for firmly securing said body to the chassis formed in part by said chassis members.

8. Apparatus according to claim 1 and additionally comprising length-adjustable leg devices movable from retracted storage positions relatively close to said body to support positions extending downwardly therefrom and laterally thereof, each of said leg devices being formed of telescopic sections permitting both lateral and vertical adjustments, the laterally adjustable sections also permitting relative rotation whereby said leg devices can be swung upwardly toward the horizontal for storage.

9. In a detachable-body cargo carrier, an elongated cargo-carrier body, a spaced pair of substantially parallel beams supportingly underlying and extending longitudinally of said body, said beams being constructed and arranged for safely lifting said body when they are simultaneously raised by lifting apparatus, and hold-down means attached to said body for engagement by co-operating means on a carrier chassis for securing said body against displacement from such a carrier during transportation.

10. Apparatus according to claim 1, said chassis members being stepped to overlie fifth-wheel structure toward their front ends and so as to be desirably low-slung toward their rear ends.

11. Apparatus according to claim 10, each of the stepped portions of said members being adapted to support a separate body.

References Cited in the file of this patent

UNITED STATES PATENTS

| | | |
|---|---|---|
| 1,425,965 | Hocke | Aug. 15, 1922 |
| 2,027,421 | Eisenberg | Jan. 14, 1936 |
| 2,123,505 | Faries | July 12, 1938 |
| 2,172,244 | Grundler | Sept. 5, 1939 |
| 2,517,304 | Greening | Aug. 1, 1950 |
| 2,596,838 | Carver et al. | May 13, 1952 |

FOREIGN PATENTS

| | | |
|---|---|---|
| 700,486 | Great Britain | Dec. 2, 1953 |